(12) United States Patent
Chi (10) Patent No.: US 7,784,451 B2
(45) Date of Patent: Aug. 31, 2010

(54) APPARATUS, SYSTEM, AND METHOD FOR CONTROLLING EXHAUST EMISSION USING A PRE-FILTER

(75) Inventor: John N. Chi, Columbus, IN (US)

(73) Assignee: Cummins IP, Inc, Minneapolis, MN (US)

( * ) Notice: Subject to any disclaimer, the term of this patent is extended or adjusted under 35 U.S.C. 154(b) by 202 days.

(21) Appl. No.: 12/184,946

(22) Filed: Aug. 1, 2008

(65) Prior Publication Data

US 2010/0024787 A1 Feb. 4, 2010

(51) Int. Cl.
*F02B 47/08* (2006.01)
*F02B 47/00* (2006.01)
(52) U.S. Cl. .................. 123/568.19; 701/108
(58) Field of Classification Search .............. 123/568, 123/19, 568.11, 568.21, 559.1, 198 F; 701/108, 701/109, 101, 102; 60/274, 278, 280, 605.1, 60/605.2
See application file for complete search history.

(56) References Cited

U.S. PATENT DOCUMENTS

| 5,533,489 | A | * | 7/1996 | Socci et al. ............. 123/568.21 |
| 5,697,867 | A |   | 12/1997 | Kono et al. |
| 6,272,427 | B1 | * | 8/2001 | Wild et al. .................. 701/108 |
| 2003/0209010 | A1 |   | 11/2003 | Arnold |

FOREIGN PATENT DOCUMENTS

| JP | 06108923 A | 4/1994 |
| JP | 2004124744 A | 4/2004 |
| JP | 2004324457 A | 11/2004 |

OTHER PUBLICATIONS

PCT/US2009/052603, International Search Report and Written Opinion, Mar. 3, 2010.

* cited by examiner

*Primary Examiner*—Mahmoud Gimie
(74) *Attorney, Agent, or Firm*—Kunzler Needham Massey & Thorpe (57) ABSTRACT

Various embodiments of an apparatus, system, and method are disclosed for improving the tracking bandwidth of an air handling system of an internal combustion engine. For example, one embodiment of an apparatus includes an intake charge module configured to determine a desired air intake flow rate into the combustion chamber based at least partially on a desired oxygen concentration in the combustion chamber. The apparatus also includes an EGR system module configured to determine a desired EGR gas flow rate into the combustion chamber based at least partially on the desired oxygen concentration in the combustion chamber. Additionally, the apparatus includes a pre-filter module configured to modify the desired air intake flow rate and the desired EGR gas flow rate based at least partially on predetermined transient response characteristics of the air handling system. The desired air intake flow rate is achievable by commanding a fresh air regulator to achieve the modified air intake flow rate and the desired EGR gas flow rate is achievable by commanding an EGR regulator to achieve the modified EGR gas flow rate.

23 Claims, 8 Drawing Sheets

APPARATUS, SYSTEM, AND METHOD FOR CONTROLLING EXHAUST EMISSION USING A PRE-FILTER

FIELD

This disclosure relates to controlling exhaust emissions for internal combustion engines, and more particularly to an apparatus, system and method for controlling exhaust emissions using a pre-filter.

BACKGROUND

Emissions regulations for internal combustion engines have become more stringent over recent years. The regulated emissions of $NO_x$ and particulates from internal combustion engines are low enough that in many cases the emissions levels cannot be met with improved combustion technologies. Therefore, the use of exhaust aftertreatment systems on engines to reduce emissions is increasing.

Many conventional exhaust aftertreatment systems provide adequate emissions reduction during steady state operating conditions of the internal combustion engine. However, some conventional exhaust aftertreatment systems are ill-equipped to handle emissions generated during transient operations of the engine. As an engine transitions from a steady state operating condition to a transient operating condition, the emissions generated by the engine can change in an often dramatic manner. Particulate matter emissions spikes can result in faster loading of particulate filters in the exhaust aftertreatment system, which requires longer and more frequent regeneration of the filters and can cause more wear on and a reduced useful life of the filters. Additionally, $NO_x$ emissions spikes can result in a lower $NO_x$ reduction efficiency and higher $NO_x$ amounts emitted from the tailpipe.

Generally, exhaust aftertreatment systems attempt to compensate for changes in exhaust emissions, e.g., $NO_x$ and particulate emissions spikes, by altering various properties of the engine and/or components of the aftertreatment system to meet desired targets. For example, the temperature of the exhaust can be changed by introducing or reducing fuel into the exhaust or increasing the EGR fraction. Similarly, the amount of emissions reduced in the exhaust aftertreatment system can be changed by increasing the temperature of various catalysts or altering the amount of reductant injected into the exhaust stream if the aftertreatment system includes a selective catalytic reduction (SCR) catalyst. Also, some engine systems include air and fuel controllers that increase or decrease the air-to-fuel ratio introduced into the cylinder of an engine in response to transient operating conditions.

Figure 4:
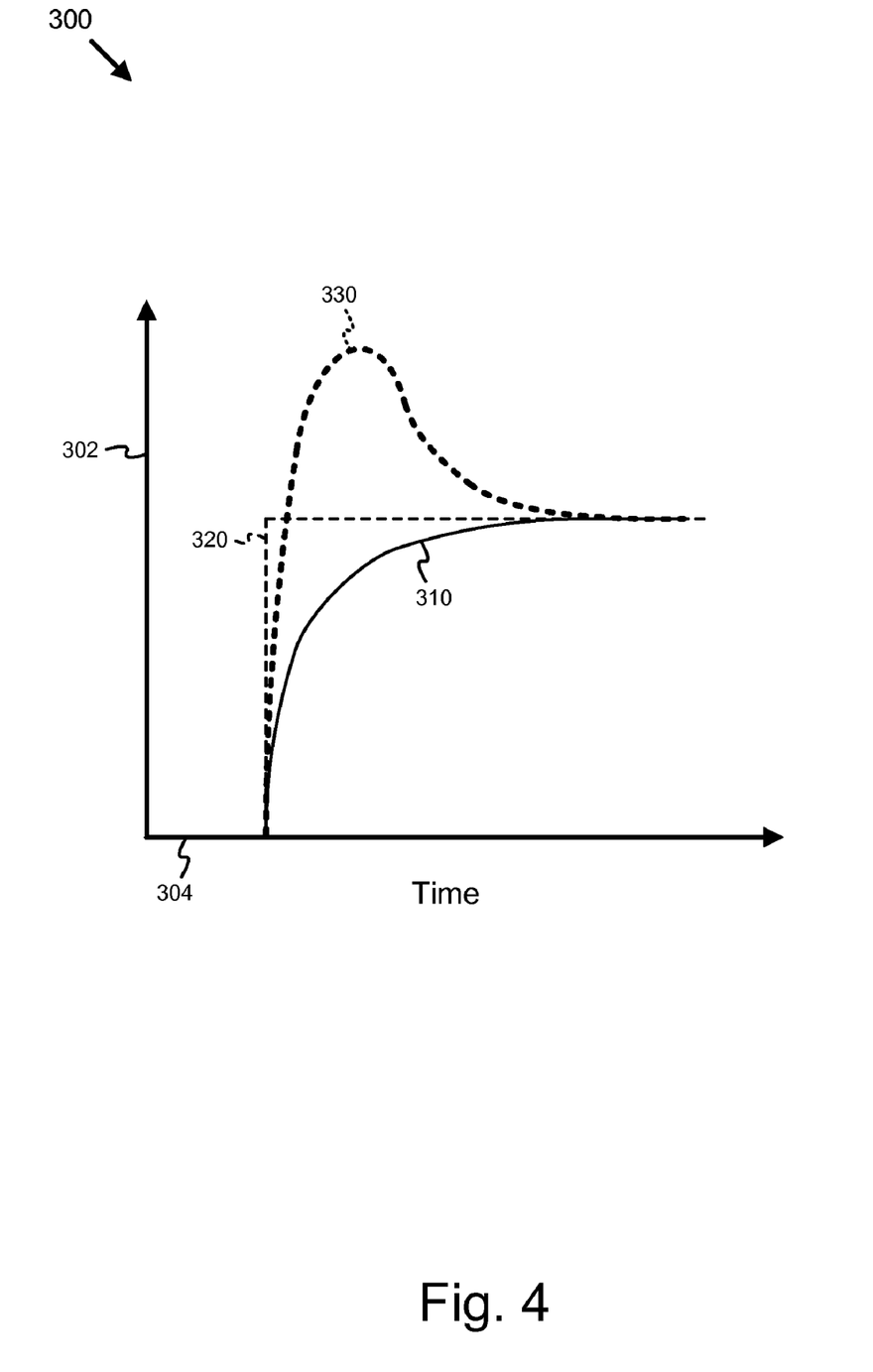
FIG. 4 is a graph illustrating time versus a commanded parameter for various system responses.

Typically, a controller will generate a reference target command corresponding to the desired target. However, the desired changes or transient calibrations in the engine and/or aftertreatment system properties necessary to compensate for the transient emissions changes are often slowly achieved. In other words, many of the desired changes often require a slow ramping-up process before the changes are reached (see, e.g., the open loop response 310 of FIG. 4). For example, a desired amount of oxygen in the cylinder corresponding to a reduction in harmful exhaust emissions may only be achieved a significant time after the desired amount of oxygen is requested by a systems controller. Because of the delay between the reference target command and achievement of the desired target, compensation for the transient exhaust emissions spikes is also delayed. Such transient exhaust emissions spikes can result in undesirable consequences, such as, for example, low control system model fidelity, inefficient emissions reduction, wear on the aftertreatment system, and damage to the aftertreatment system.

However, if the particulate matter and $NO_x$ emissions spikes during transient operations of the vehicle are regulated, e.g., reduced, the desired changes and transient calibrations can be achieved more quickly, which would result in exhaust aftertreatment systems more readily compensating for emissions spikes and an increase in emissions reduction efficiency. Moreover, lower emission spikes would result in lower particulate matter build-up rates on particulate matter filters, which would increase the life and durability of the filters.

SUMMARY

The subject matter of the present application has been developed in response to the present state of the art, and in particular, in response to the problems and needs in the art that have not yet been fully solved by currently available systems and methods. Accordingly, the subject matter of the present application has been developed to provide an apparatus, system, and method that overcomes at least some shortcomings of the prior art. For example, various embodiments of an apparatus, system, and method for reducing particulate matter and $NO_x$ emissions spikes during transient operation of internal combustion engines that meets transient emissions targets and improve the durability and reliability of exhaust aftertreatment systems are described herein. Generally, the advantages of the present application are obtained by improving the tracking bandwidth of the air handling system, e.g., air intake and EGR systems.

More specifically, according to one representative embodiment, an apparatus for improving the tracking bandwidth of an air handling system of an internal combustion engine is described. The air handling system includes a fresh air regulator configured to regulate the flow rate of fresh air into a combustion chamber of the engine and an exhaust gas recirculation (EGR) regulator for regulating the flow rate of EGR gas into the combustion chamber. The apparatus includes an intake charge module configured to determine a desired air intake flow rate into the combustion chamber based at least partially on a desired oxygen concentration in the combustion chamber. The apparatus also includes an EGR system module configured to determine a desired EGR gas flow rate into the combustion chamber based at least partially on the desired oxygen concentration in the combustion chamber. Additionally, the apparatus includes a pre-filter module configured to modify the desired air intake flow rate and the desired EGR gas flow rate based at least partially on predetermined transient response characteristics of the air handling system. The desired air intake flow rate is achievable by commanding the fresh air regulator and air intake throttle to achieve the modified air intake flow rate and the desired EGR gas flow rate is achievable by commanding the EGR regulator to achieve the modified EGR gas flow rate.

In certain implementations, the pre-filter module is configured to increase the desired air intake flow rate and the desired EGR gas flow rate such that the modified air intake flow rate is higher than the desired air intake flow rate and the modified EGR gas flow rate is higher than the desired EGR gas flow rate.

In specific instances, the actual air intake flow rate response resulting from the commanded air intake flow rate initially overshoots the desired air intake flow rate. Similarly, an actual EGR flow rate response resulting from the commanded EGR gas flow rate can initially overshoot the desired EGR gas flow rate. An actual air intake flow rate response can increase up to an air intake flow rate above the desired air intake flow rate during a first time period and decrease down to the desired air intake flow rate during a second time period following the first time period. Moreover, an actual EGR flow rate response can increase up to an EGR gas flow rate above the desired EGR gas flow rate during a first time period and decrease down to the desired EGR gas flow rate during a second time period following the first time period. In certain instances, the fresh air regulator includes a variable geometry turbocharger and the EGR regulator includes an EGR valve. The fresh air regulator can also include an air intake assist throttle.

According to some implementations, the modified air intake flow rate is determined by multiplying the desired air intake flow rate by the inverse of Equation 14 where P(s) is a transfer function of fresh air regulator, K(s) is a transfer function of a fresh air flow command generation module (e.g., an air intake controller), and I is an identity matrix. Similarly, in some implementations, the modified EGR gas flow rate also is determined by multiplying the desired EGR gas flow rate by Equation 14 where P(s) is a transfer function of the EGR regulator, K(s) is a transfer function of an EGR command generation module (e.g., an EGR controller), and I is an identity matrix. In some applications, the modified air intake flow rate and modified EGR gas flow rate are determined together according to Equation 16.

In another representative embodiment, a method for controlling the flow rate of air intake and exhaust gas recirculation (EGR) gas into a combustion chamber of an internal combustion engine is described. The flow rate of the air intake being regulated by a variable geometry turbocharger (VGT) and the flow rate of the EGR gas being regulated by an EGR valve. The method includes determining a desired air intake flow rate and a desired EGR gas flow rate corresponding to a desired oxygen concentration in the combustion chamber. Further, the method includes multiplying the desired air intake flow rate and desired EGR gas flow rate by a pre-filter modifier to obtain a modified air intake flow rate and modified EGR gas flow rate. The method also includes commanding the VGT according to the modified air intake flow rate to achieve the desired air intake flow rate and commanding the EGR valve according to the modified EGR gas flow rate to achieve the desired EGR gas flow rate.

In some implementations, the pre-filter modifier is at least partially dependent on the transient response characteristics of the VGT, air intake throttle, and EGR valve. The pre-filter modifier can be at least partially dependent on an operating mode of the internal combustion engine.

In certain implementations, the method includes determining an actual air intake flow rate and an actual EGR gas flow rate, as well as calculating a first difference between the actual air intake flow rate and the desired air intake flow rate and calculating a second difference between the actual EGR gas flow rate and the desired EGR gas flow rate. Additionally, the method includes modifying the modified air intake flow rate according to the first difference and modifying the modified EGR gas flow rate according to the second difference.

According to some implementations, the air intake flow rate generated by the VGT in response to commanding the VGT initially overshoots the desired air intake flow rate. Additionally, the EGR gas flow rate generated by the EGR valve in response to commanding the EGR valve can initially overshoot the desired EGR gas flow rate.

The pre-filter modifier can be selected from a plurality of pre-filter modifiers each corresponding to a respective operating condition of the internal combustion engine.

According to another embodiment, an internal combustion engine system includes an internal combustion engine generating an engine output exhaust, an air handling system for injecting combustion gas into the engine comprising a variable geometry turbocharger (VGT), an air intake assist throttle, and an EGR valve, and a controller. The controller including am air handling systems parameters module, a pre-filter module, and a command module. The air handling system parameters module is configured to determine a desired air intake flow rate and a desired EGR gas flow rate into the engine. The desired air intake and EGR gas flow rates correspond to a desired emissions level in the engine output exhaust. The pre-filter module is configured to determine a modified air intake flow rate and a modified EGR gas flow rate based at least partially on command response characteristics of the air handling system. The command module is configured to command the VGT and air intake assist throttle according to the modified air intake flow rate and command the EGR valve according to the modified EGR gas flow rate. The actual air intake flow rate produced by the VGT and air intake assist throttle in response to the air intake throttle command achieves the desired air intake flow rate and the actual EGR gas flow rate produced by the EGR valve in response to the EGR valve command achieves the desired EGR gas flow rate.

According to some implementations, the system also includes a fuel injection system. The controller can include an air-to-fuel ratio module configured to determine a desired air-to-fuel ratio. In such implementations, the command module is configured to command the fuel injection system to inject an amount of fuel into the engine for achieving the desired air-to-fuel ratio. The commanded fuel amount is dependent on the desired air intake flow rate and desired EGR gas flow rate.

In certain implementations, an actual air intake flow rate response increases up to an air intake flow rate above the desired air intake flow rate during a first time period and decreases down to the desired air intake flow rate during a second time period following the first time period. Similarly, an actual EGR flow rate response increases up to an EGR gas flow rate above the desired EGR gas flow rate during a third time period and decreases down to the desired EGR gas flow rate during a fourth time period following the third time period.

In some implementations of the system, the modified air intake flow rate is higher than the desired air intake flow rate and the modified EGR gas flow rate is higher than the desired EGR gas flow rate.

According to certain implementations, the pre-filter module includes a predetermined air intake and EGR gas scheduling strategy map indicating a plurality of predetermined flow rate modifiers for each of a plurality of engine operating modes. The pre-filter module determines the modified air intake flow rate by multiplying the flow rate modifier associated with the operating mode within which the engine is operating by the desired air intake flow rate. Similarly, the pre-filter module determines the modified EGR gas flow rate by multiplying the flow rate modifier associated with the operating mode within which the engine is operating by the desired EGR gas flow rate.

In some implementations, the controller further includes a feedback module configured to determine any discrepancies between the actual air intake flow rate and desired air intake flow rate and the actual EGR gas flow rate and desired EGR gas flow rate. The command module is configured to modify the modified air intake flow rate according to determined discrepancies between the actual air intake flow rate and desired air intake flow rate. Additionally, the command module is configured to modify the modified EGR gas flow rate according to determined discrepancies between the actual EGR gas flow rate and desired EGR gas flow rate.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the subject matter of the present disclosure may be combined in any suitable manner in one or more embodiments. One skilled in the relevant art will recognize that the subject matter may be practiced without one or more of the specific features or advantages of a particular embodiment. In other instances, additional features and advantages may be recognized in certain embodiments that may not be present in all embodiments. These features and advantages will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the subject matter described herein may be combined in any suitable manner in one or more embodiments. In the following description, numerous specific details are provided, such as examples of controls, structures, algorithms, programming, software modules, user selections, network transactions, database queries, database structures, hardware modules, hardware circuits, hardware chips, etc., to provide a thorough understanding of embodiments of the subject matter. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the disclosed subject matter.

Figure 1:
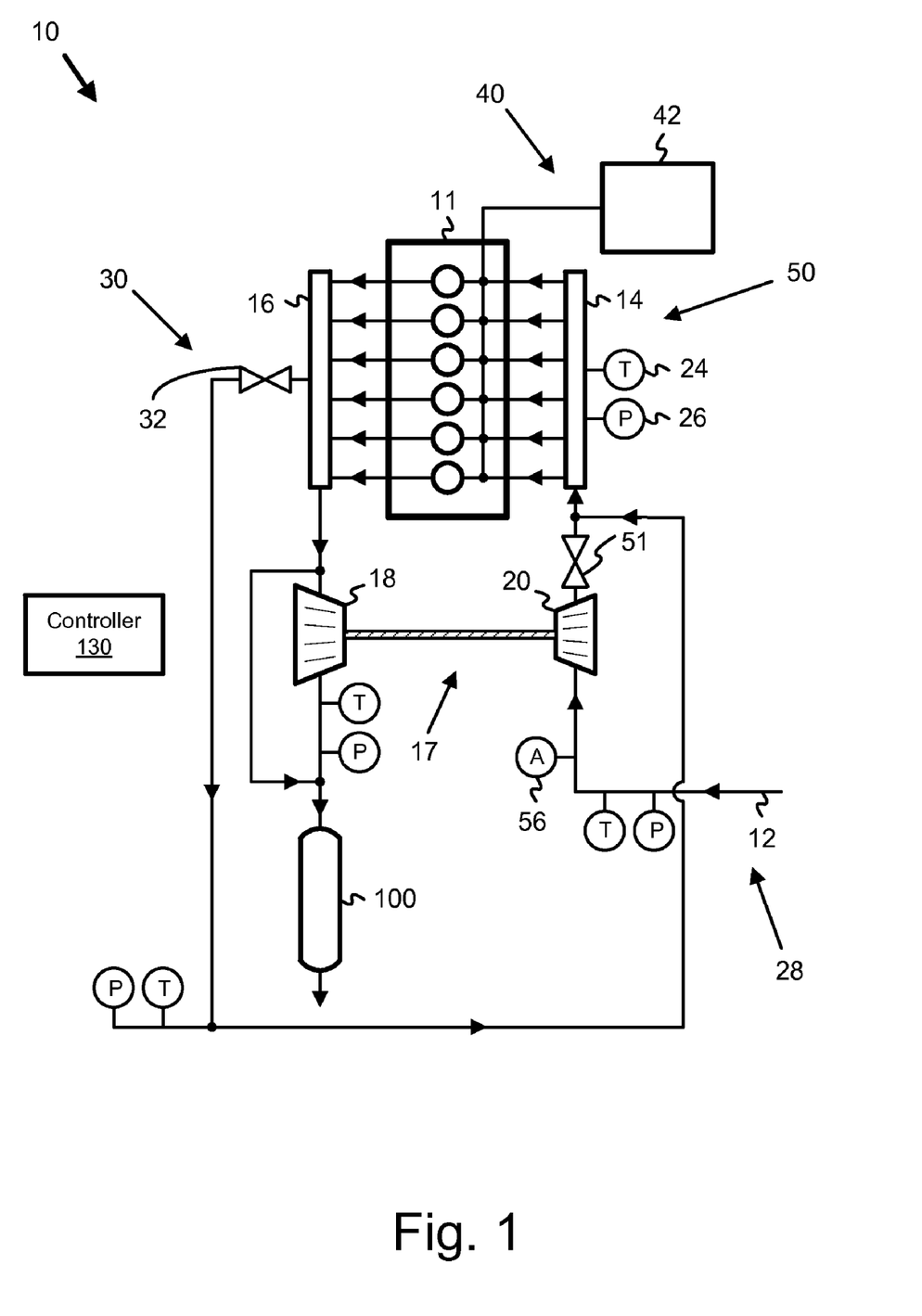
FIG. 1 is a schematic diagram of an internal combustion engine system having an exhaust after-treatment system according to one representative embodiment.

FIG. 1 depicts one embodiment of an internal combustion engine system 10. The main components of the engine system 10 include an internal combustion engine 11 and an exhaust gas after-treatment system 100 coupled to the engine. The internal combustion engine 11 can be a compression ignited internal combustion engine, such as a diesel fueled engine, or a spark-ignited internal combustion engine, such as a gasoline fueled engine operated lean. The engine system 10 further includes an air handling system 50 having an air inlet 12, intake manifold 14, fresh air regulator (e.g., turbocharger 17), and EGR system 30.

The air inlet 12 is vented to the atmosphere and connected to an inlet of the intake manifold 14 to enable air to enter the intake manifold. The intake manifold 14 includes an outlet operatively coupled to compression chambers or cylinders of the internal combustion engine 11 for introducing intake charge from the turbocharger 17, e.g., air, and EGR gas into the compression chambers.

The turbocharger 17 includes a turbocharger turbine 18 and turbocharger compressor 20. In certain implementations, the turbocharger 17 is a variable geometry turbocharger (VGT) such as is commonly known in the art. The VGT turbocharger includes vanes or a rack that is actuatable to control the flow rate of pressurized air into the intake manifold 14. Further, as shown, the engine system 10 can include an intake throttle 51 position downstream of the compressor 20. The intake throttle 51 is actuatable to control the flow rate of fresh air into the intake manifold 14. The engine system 10 then can include a non-variable geometry turbocharger and an intake throttle 51, a VGT turbocharger without an intake throttle, or a VGT turbocharger with an intake throttle.

The engine system 10 also includes a fuel delivery system 40 having a fuel supply 42 is also included with the engine system 10. Moreover, the engine system 10 also includes an exhaust manifold 16, temperature sensors (e.g., temperature sensor 24), pressure sensors (e.g., pressure sensor 26), and air-flow sensor 56. The fuel delivery system 40 introduces fuel into the cylinders to intermix with the intake charge and EGR gas prior to a combustion event in the cylinder.

Within the internal combustion engine 11, the air from the atmosphere, and EGR gas if desired, is combined with fuel to power the engine. Combustion of the fuel and air produces exhaust gas that is operatively vented to the exhaust manifold 16. From the exhaust manifold 16, a portion of the exhaust gas may be used to power the turbocharger turbine 18. The turbine 18 drives the turbocharger compressor 20, which may compress at least some of the air entering the air inlet 12 before directing it to the intake manifold 14 and into the compression chambers of the engine 11.

The exhaust gas after-treatment system 100 is coupled to the exhaust manifold 16 of the engine 11. At least a portion of the exhaust gas exiting the exhaust manifold 16 can pass through the exhaust after-treatment system 100. In certain implementations, the engine system 10 includes EGR system 30 having an EGR regulator (e.g., EGR valve 32) configured to open or close to allow a desired portion of the exhaust gas to recirculate back into the compression chambers for altering the combustion properties of the engine 11. Moreover, the EGR valve 32 is actuatable to control the flow rate of EGR gas into the intake manifold 14. Additionally, the flow rate of EGR gas is indirectly controllable by actuation of the VGT rack. For example, as the rack is actuated into a relatively closed position, a backpressure is induced in the exhaust manifold (e.g., a pressure difference is created across the engine), which can result in an increase in the flow rate of EGR gas be reintroduced into the engine. Conversely, as the EGR valve 32 closes to reduce the flow rate of EGR gas, additional exhaust gas is passed through the VGT such that the flow rate of fresh air into the intake manifold 14 can be increased. Generally, the relationship between air intake and EGR gas flow rates can be obtained from a predetermined look-up table such as an EGR/VGT sweep chart.

Figure 2:
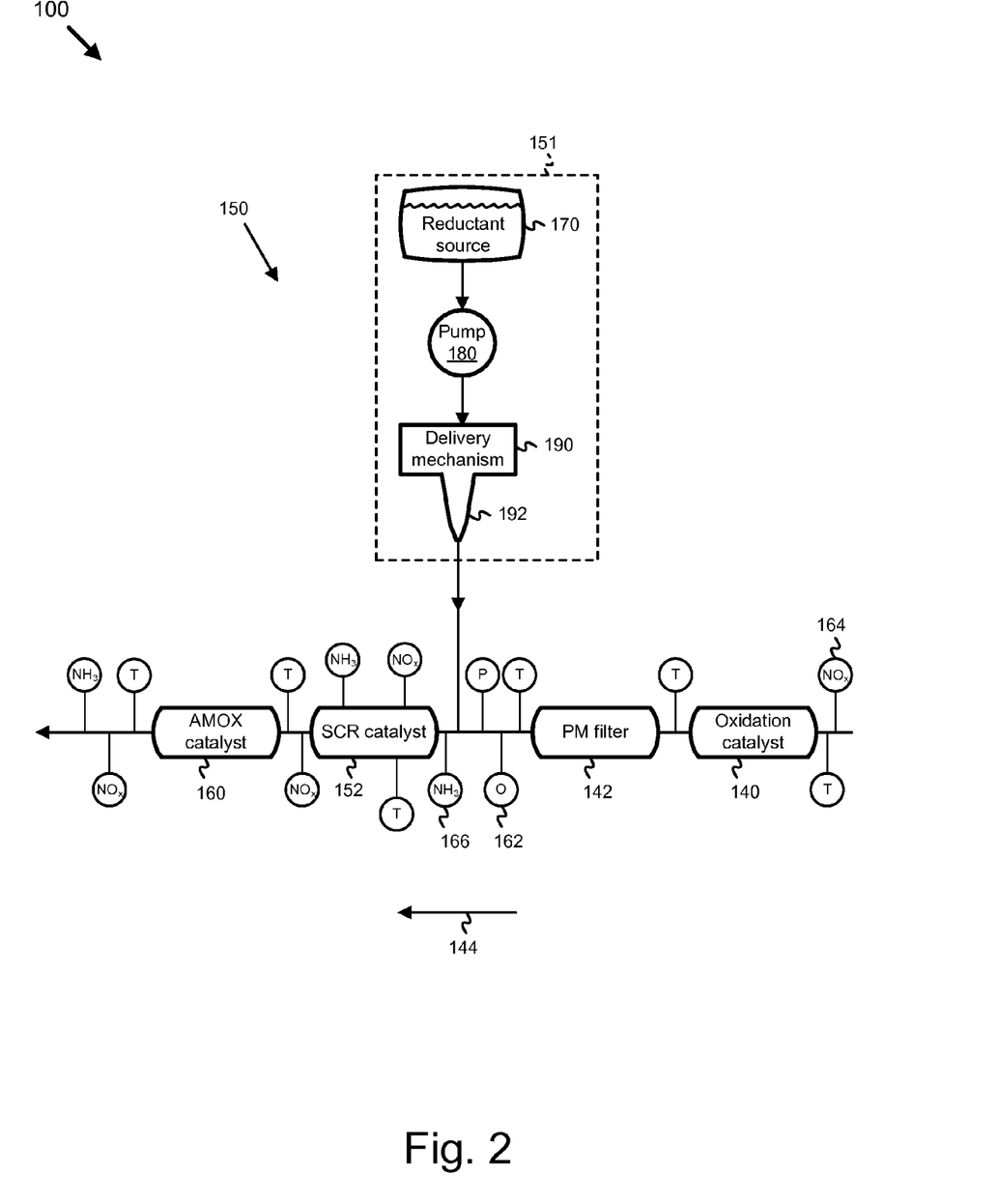
FIG. 2 is a more detailed schematic diagram of the exhaust after-treatment system of FIG. 1 according to one representative embodiment.

Generally, the exhaust gas after-treatment system 100 is configured to remove various chemical compound and particulate emissions present in the exhaust gas received from the exhaust manifold 16 and not recirculated back into the engine 11. The exhaust gas after-treatment system 100 includes an oxidation catalyst 140, particulate matter (PM) filter 142, SCR system 150 having an SCR catalyst 152, and ammonia oxidation (AMOX) catalyst 160. In an exhaust flow direction, indicated by directional arrow 144, exhaust may flow from the exhaust manifold 16, through the oxidation catalyst 140, through the particulate filter 142, through the SCR catalyst 152, through the AMOX catalyst 160, and then be expelled into the atmosphere. In other words, the particulate filter 142 is positioned downstream of the oxidation catalyst 140, the SCR catalyst 152 is positioned downstream of the particulate filter 142, and the AMOX catalyst 160 is positioned downstream of the SCR catalyst 152. Generally, exhaust gas treated in the exhaust gas after-treatment system 100 and released into the atmosphere consequently contains significantly fewer pollutants, such as diesel particulate matter, $NO_x$, hydrocarbons, carbon monoxide, and carbon dioxide, than untreated exhaust gas.

The oxidation catalyst 140 can be any of various flow-through, diesel oxidation catalysts (DOC) known in the art. Generally, the oxidation catalyst 140 is configured to oxidize at least some particulate matter, e.g., the soluble organic fraction of soot, in the exhaust and reduce unburned hydrocarbons and CO in the exhaust to less environmentally harmful compounds. For example, the oxidation catalyst 140 may sufficiently reduce the hydrocarbon and CO concentrations in the exhaust to meet the requisite emissions standards.

The particulate filter 142 can be any of various particulate filters known in the art configured to reduce particulate matter concentrations, e.g., soot and ash, in the exhaust gas to meet requisite emission standards. The particulate filter 142 can be electrically coupled to a controller, such as controller 130, that controls various characteristics of the particulate filter, such as, for example, the timing and duration of filter regeneration events. In some implementations, the particulate filter 142 and associated control system is similar to, or the same as, the respective particulate filters and control systems described in U.S. patent application Ser. Nos. 11/227,320; 11/227,403; 11/227,857; and 11/301,998, which are incorporated herein by reference.

The SCR system 150 can be similar to the SCR system described in U.S. patent application Ser. Nos. 12/112,500; 12/112,622; 12/112,678; and 12/112,795, each filed Apr. 30, 2008 (hereinafter "incorporated U.S. patent applications"), which are each incorporated herein by reference. For example, the SCR system 150 includes a reductant delivery system 151 that includes a reductant source 170, pump 180 and delivery mechanism 190. The reductant source 170 can be a container or tank capable of retaining a reductant, such as, for example, ammonia ($NH_3$), urea, diesel fuel, or diesel oil. The reductant source 170 is in reductant supplying communication with the pump 180, which is configured to pump reductant from the reductant source to the delivery mechanism 190. The delivery mechanism 190 can include a reductant injector schematically shown at 192 positioned upstream of the SCR catalyst 152. The injector is selectively controllable to inject reductant directly into the exhaust gas stream prior to entering the SCR catalyst 152. In some embodiments, the reductant can either be ammonia or urea, which decomposes to produce ammonia. The ammonia reacts with $NO_x$ in the presence of the SCR catalyst 152 to reduce the $NO_x$ to less harmful emissions, such as $N_2$ and $H_2O$. The SCR catalyst 152 can be any of various catalysts known in the art. For example, in some implementations, the SCR catalyst 152 is a vanadium-based catalyst, and in other implementations, the SCR catalyst is a zeolite-based catalyst, such as a Cu-Zeolite or a Fe-Zeolite catalyst. In one representative embodiment, the reductant is aqueous urea and the SCR catalyst 152 is a zeolite-based catalyst.

The AMOX catalyst 160 can be any of various flow-through catalysts configured to react with ammonia to produce mainly nitrogen. Generally, the AMOX catalyst 160 is utilized to remove ammonia that has slipped through or exited the SCR catalyst 152 without reacting with $NO_x$ in the exhaust. In certain instances, the system 10 can be operable with or without an AMOX catalyst. Further, although the AMOX catalyst 160 is shown as a separate unit from the SCR catalyst 152, in some implementations, the AMOX catalyst can be integrated with the SCR catalyst, e.g., the AMOX catalyst and the SCR catalyst can be located within the same housing.

As shown in FIG. 2, the exhaust after-treatment system 100 includes various sensors, such as temperature sensors, pressure sensors, oxygen sensors (e.g., oxygen sensor 162), $NO_x$ sensors (e.g., $NO_x$ sensor 164), $NH_3$ sensors (e.g., $NH_3$ sensor 166), dual ammonia/$NO_x$ sensors (not shown) and the like, that are disposed throughout the exhaust gas after-treatment system. The various sensors may be in electrical communication with the controller 130 to monitor operating conditions and control the engine system 10, including the exhaust after-treatment system 100.

Although the exhaust after-treatment system 100 shown includes one of an oxidation catalyst 140, particulate filter 142, SCR catalyst 152, and AMOX catalyst 160 positioned in specific locations relative to each other along the exhaust flow path, in other embodiments, the exhaust after-treatment system may include more than one of any of the various catalysts positioned in any of various positions relative to each other along the exhaust flow path as desired. Further, although the oxidation catalyst 140 and AMOX catalyst 160 are non-selective catalysts, in some embodiments, the oxidation and AMOX catalysts can be selective catalysts.

The engine system 10 includes a controller 130 that is depicted in FIG. 2 as a single physical unit, but can include two or more physically separated units or components in some embodiments if desired. Generally, the controller 130 receives multiple inputs, processes the inputs, and transmits multiple outputs. The multiple inputs may include sensed measurements from the sensors and various user inputs. The inputs are processed by the controller 130 using various algorithms, stored data, and other inputs to update the stored data and/or generate output values. The generated output values and/or commands are transmitted to other components of the controller and/or to one or more elements of the engine system 10 to control the system to achieve desired results, and more specifically, achieve desired exhaust gas emissions.

The controller 130 controls the operation of the engine system 10 and associated sub-systems, such as the engine 11, fuel injection system 40, air handling system 50, and exhaust gas aftertreatment system 100. The controller 130 includes various modules for controlling the operation of the engine system 10. For example, the controller 130 includes one or more modules (not shown) for controlling the operation of the particulate filter 142 as described above. The controller 130 also includes one or more modules for controlling the operation of the SCR system 150. The controller 130 further includes one or more modules (not shown) for controlling the operation of the engine 11. Additionally, in the event the oxidation catalyst 140 and AMOX catalyst 160 are selectively controllable, the controller 130 can include one or more modules (not shown) for controlling the operation of the respective oxidation and AMOX catalysts.

In operation, the controller 130 is configured to command the reductant delivery mechanism 190 to inject reductant into the exhaust stream at a specified reductant dosing rate based on a commanded reductant dosing rate. More specifically, in certain embodiments, the controller 130 determines a modified reductant dosing rate command 240 representing a modified reductant dosing rate and communicates the command 240 to the reductant delivery mechanism 190.

In some implementations, the engine system 10 does not include an exhaust aftertreatment system. In such implementations, the controller 130 can control the emissions generated by the engine 11 such that the generated emissions meet the required emissions standards. Whether an engine system (e.g., system 10) has an aftertreatment system (e.g., system 100) or not, the controller 130 is configured to control the operating parameters of the engine to regulate the emissions generated by the engine 11 as discussed in more detail below.

Particulate matter and $NO_x$ emissions are largely dependent on the mole fraction of oxygen in the cylinder during combustion, which is hereinafter referred to as "in-cylinder oxygen." For example, the mole fraction of in-cylinder oxygen determines the level of $NO_x$ emissions in the exhaust and the oxygen-to-fuel ratio, e.g., air-to-fuel ratio, which is dependent upon the mole fraction of in-cylinder oxygen, determines the amount of particulate matter emissions in the exhaust stream. The mole fraction of in-cylinder oxygen in a diesel-fueled combustion engine can be determined according to theoretical models as follows.

The mass balance oxidation of diesel fuel in a diesel-fueled engine operating under lean operating conditions can be represented by Equation 1 as follows:

$$\epsilon\phi CH_y + (O_2 + \psi N_2) \mapsto \epsilon\phi CO_2 + 2(1-\epsilon)\phi H_2O + (1-\phi)O_2 + \psi N_2 \quad (1)$$

where $\epsilon$ is equal to $4/(4+y)$, $\psi$ is equal to 3.773, y is equal to 1.85, and $\phi$ is equal to an equivalence ratio. The value for $\psi$ and y varies according to the particular diesel fuel being combusted. According to Equation 1 as shown, the diesel fuel being combusted is Number 2 diesel fuel. The equivalence ratio is defined as the ratio of the commanded air-to-fuel ratio to the stoichiometric or ideal air-to-fuel ratio. Accordingly, the mass balance oxidation expressed in Equation 1 is dependent on the air-to-fuel ratio. In certain embodiments, the equivalence ratio is obtained from experimentally measured air-to-fuel ratio values using common test cell experimentation techniques.

Based on mass balance in Equation 1, the mole fraction of oxygen in the exhaust is given by Equation 2 as follows:

$$\chi_{O_2,exhaust} = \frac{n_{O_2}}{n_{CO_2} + n_{H_2O} + n_{O_2} + n_{N_2}} = \frac{1-\phi}{(1-\epsilon)\phi + 1 + \psi} \quad (2)$$

where $n_x$ is equal to the mole fraction of the particular component x. In engine systems having an exhaust oxygen sensor, such as sensor 162, the mole fraction of oxygen in the exhaust $\chi_{O_2,exhaust}$ is known such that the air-to-fuel ratio can be determined through application of Equation 2. In contrast, for engine systems that do not have an exhaust oxygen sensor, a determination of the fresh air flow rate and fuel flow rate entering the cylinder is required to calculate the mole fraction of oxygen in the exhaust $\chi_{O_2,exhaust}$. Values for the fresh air flow rate and fuel flow rate can be determined via physical sensors, virtual sensors, or a combination of both.

The intake charge into the cylinder includes fresh air and, for engine systems having EGR components, the components of the post-combustion exhaust. Referring to Equation 1, the fresh air includes the components $O_2$ and $\psi N_2$ from the reactant side of Equation 1, and the components of the post-combustion exhaust include the products of Equation 1. Therefore, the mole fraction of oxygen in the intake charge $\chi_{O_2,intake}$ can be expressed as follows:

$$\chi_{O_2,intake} = \frac{n_{O_2}}{n_{CO_2} + n_{H_2O} + n_{O_2} + n_{N_2}} \quad (3)$$

$$= \frac{1 - X_{egr}\phi_{egr}}{1 + \psi + X_{egr}(1-\varepsilon)\phi_{egr}}$$

where $X_{egr}$ is the mole fraction of EGR entering the cylinder and $\phi_{egr}$ is equal to the equivalence ratio of EGR. The EGR equivalence ratio is defined as the ratio of the actual air-to-fuel ratio to the stoichiometric air-to-fuel ratio of the EGR gas.

EGR measurements can be expressed in terms of mass fraction. The EGR mole fraction $X_{egr}$ can be expressed as a function of the EGR mass fraction $x_{egr}$ (as expressed in Equation 5) as follows:

$$X_{egr} = \frac{\frac{\dot{m}_{egr}}{M_{egr}}}{\frac{\dot{m}_{air}}{M_{air}} + \frac{\dot{m}_{egr}}{M_{egr}}} = \frac{1}{1 + \left(\frac{M_{egr}}{M_{air}}\right)\left(\frac{1-x_{egr}}{x_{egr}}\right)} \quad (4)$$

$$x_{egr} = \frac{\dot{m}_{egr}}{\dot{m}_{air} + \dot{m}_{egr}} \quad (5)$$

where $\dot{m}_{air}$ is the flow rate of fresh air into the cylinder, $\dot{m}_{egr}$ is the flow rate of EGR into the cylinder, $M_{air}$ is the molarity of the fresh air entering the cylinder and $M_{egr}$ is the molarity of EGR entering the cylinder. The molarity of the fresh air entering the cylinder $M_{air}$ and the molarity of EGR entering the cylinder $M_{egr}$ are determined from Equations 6 and 7, respectively, as follows:

$$M_{air} = \frac{1}{1+\psi}M_{O_2} + \frac{\psi}{1+\psi}M_{N_2} \quad (6)$$

$$M_{egr} = \frac{\varepsilon\phi_{egr}M_{CO_2} + 2(1-\varepsilon)\phi_{egr}M_{H_2O} + (1-\phi_{egr})M_{O_2} + \psi M_{N_2}}{1 + \psi + (1-\varepsilon)\phi_{egr}} \quad (7)$$

where $M_{CO_2}$, $M_{H_2O}$, $M_{O_2}$, and $M_{N_2}$ are the molarities of $CO_2$, $H_2O$, $O_2$, and $N_2$, respectively, entering the cylinder. According to one exemplary implementation of a diesel engine using Number 2 diesel fuel, the molarity of air $M_{air}$ entering the cylinder is approximately 28.85 g/mol.

The in-cylinder charge, i.e., the charge within the cylinder, includes the intake charge as described above and any residual gases remaining in the cylinder from the previous combustion cycle. Due to the inherent inefficiencies of the gas exchange process in a combustion cycle, residual gas remains within the cylinder after a combustion cycle. The components of the residual gas in the cylinder can be expressed as follows:

$$\varepsilon\phi_{res}CO_2 + 2(1-\varepsilon)\phi_{res}H_2O + (1\phi_{res})O_2 + \psi N_2 \quad (8)$$

where $\phi_{res}$ is equal to the equivalence ratio of the residual gas in the cylinder. The residual gas equivalence ratio $\phi_{res}$ is defined as the ratio of the air-to-fuel ratio to the stoichiometric air-to-fuel ratio of the residual gas in the cylinder. The mole fraction of oxygen in the cylinder $\chi_{O_2,cylinder}$ can then be expressed as follows:

$$\chi_{O_2,cylinder} = \frac{n_{O_2}}{n_{CO_2} + n_{H_2O} + n_{O_2} + n_{N_2}} \quad (9)$$

$$= \frac{1 - X_{egr}\phi_{egr} - X_{res}\phi_{res}}{1 + \psi + X_{egr}(1-\varepsilon)\phi_{egr} + X_{res}(1-\varepsilon)\phi_{res}}$$

where $X_{egr}$ is the mole fraction of EGR from the intake charge, e.g., external EGR, as expressed above in Equation 4 and $X_{res}$ is the mole fraction of the residual gas, e.g., internal EGR. The mole fraction of the residual gas $X_{res}$ is expressed as follows:

$$X_{res} = \frac{\frac{\dot{m}_{res}}{M_{res}}}{\frac{\dot{m}_{air}}{M_{air}} + \frac{\dot{m}_{egr}}{M_{egr}} + \frac{\dot{m}_{res}}{M_{res}}} \quad (10)$$

where $M_{res}$ is the molarity of the residual gas in the cylinder. The molarity of residual gas in the cylinder $M_{res}$ can be expressed as follows:

$$M_{res} = \frac{\varepsilon\phi_{res}M_{CO_2} + 2(1-\varepsilon)\phi_{res}M_{H_2O} + (1-\phi_{res})M_{O_2} + \psi M_{N_2}}{1 + \psi + (1-\varepsilon)\phi_{res}} \quad (11)$$

Referring to Equation 9, the in-cylinder oxygen concentration $\chi_{O_2,cylinder}$ depends on the external EGR mole fraction $X_{egr}$, the equivalence ratio of the external EGR $\phi_{egr}$, the internal EGR mole fraction $X_{res}$, and the equivalence ratio of the internal EGR $\phi_{res}$. Ignoring the components from the internal EGR, the three parameters affecting the in-cylinder oxygen content are the intake charge flow rate, the EGR mole fraction $X_{egr}$, and the air-to-fuel ratio. As discussed previously, the concentration of oxygen in the cylinder impacts the $NO_x$ and particulate matter emissions generated by the engine. Generally, excess oxygen in the cylinder results in high $NO_x$ emissions and low particulate matter emissions, and lower oxygen concentrations in the cylinder results in low $NO_x$ emissions and high particulate matter emissions. Correspondingly, when excess oxygen is in the cylinder, it is harder to control $NO_x$ emissions, and when a deficient amount of oxygen is in the cylinder, it is harder to control particulate matter emissions. To properly control both $NO_x$ and particulate matter emissions, a desired amount of oxygen should be introduced into the cylinder corresponding to a desired level of both $NO_x$ and particulate matter emissions control.

Each of the above three parameters affecting oxygen content can be regulated by a systems controller, such as the controller 130. However, when regulated by a systems controller, each parameter has different transient response characteristics and time constants. When the actual response of the parameters does not match up with the commanded response of the parameters, the tracking performance, e.g., tracking bandwidth, of the system is reduced and undesirable results, e.g., high exhaust emissions, can occur. The closer the actual response of the parameters to the commanded response, the better the tracking bandwidth of the system and control over the exhaust emissions. Accordingly, in some embodiments, the apparatus, method, and system described herein are configured to synchronize the intake charge flow rate, the EGR mole fraction $X_{egr}$, and air-to-fuel ratio commands and improve the tracking bandwidth of the system by reducing discrepancies between commanded and actual intake charge flow rate, EGR mole fraction, and air-to-fuel ratio via a pre-filter to achieve a desired reduction in $NO_x$ and particulate emissions as well as a balance between $NO_x$ and particulate matter emissions for a given combustion cycle during transient operating conditions.

Figure 3:
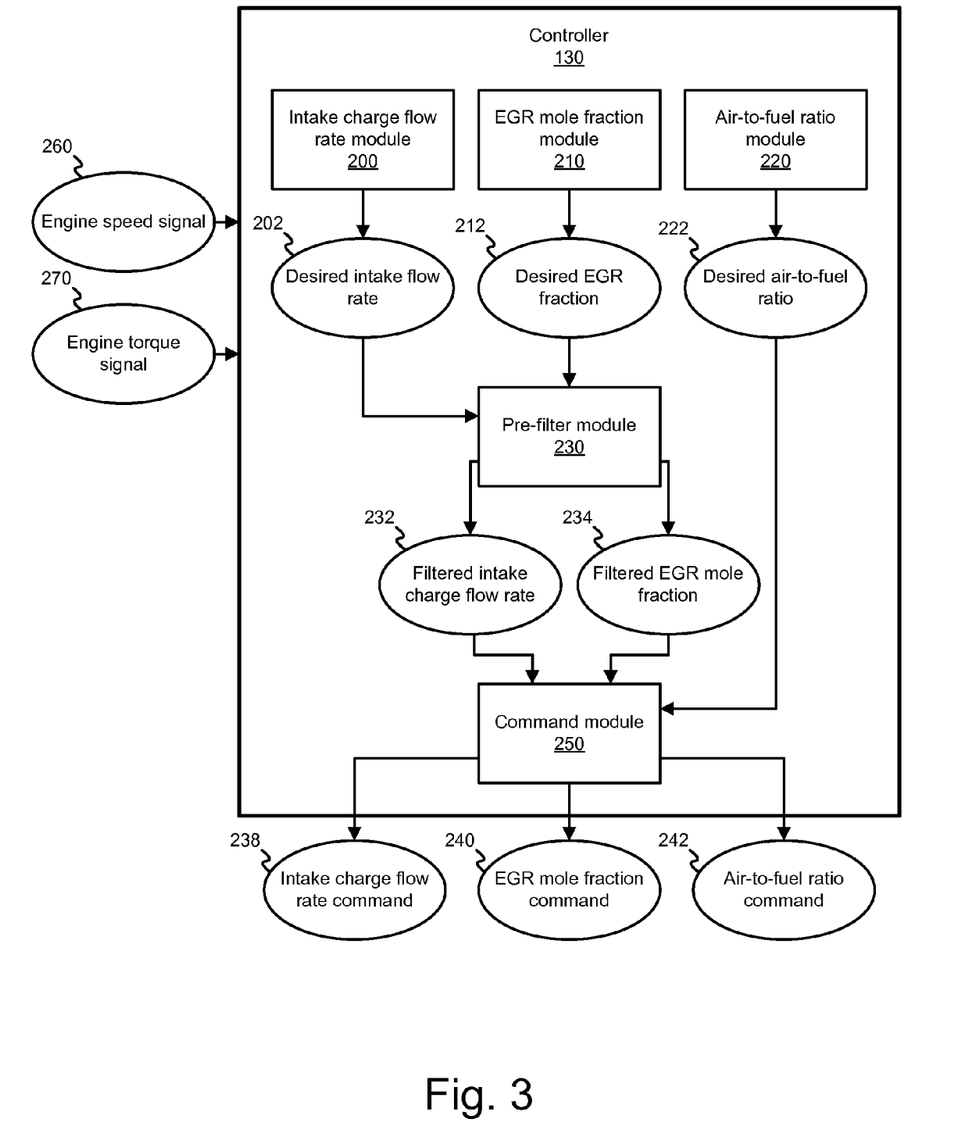
FIG. 3 is a schematic diagram of a controller of the internal combustion engine system according to one representative embodiment.

Referring to FIG. 3, the controller 130 can include an intake charge flow rate module 200, an EGR mole fraction module 210, and an air-to-fuel ratio module 220. The intake charge flow rate module 200 is configured to determine a desired air intake charge flow rate 202 corresponding to the flow rate of fresh air necessary to achieve a desired amount of in-cylinder fresh air. The EGR mole fraction module 210 is configured to determine a desired EGR mole fraction 212 in the cylinder. The air-to-fuel ratio module 220 is configured to determine a desired air-to-fuel ratio 222 in the cylinder. The modules 200, 210, 220 work synchronously to determine a desired intake charge flow rate 202, desired EGR mole fraction 212, and desired air-to-fuel ratio 222, respectively, that together provide desired in-cylinder oxygen concentration for achieving desired $NO_x$ and particulate matter emissions in the post-combustion exhaust.

However, because each parameter has different transient response characteristics and time constants, the desired intake charge flow rate 202 and desired EGR mole fraction 212 can be modified or filtered such that the actual intake charge flow rate and EGR mole fraction correspond to the respective desired parameters. Accordingly, the controller 130 includes a pre-filter module 230 configured to generate a filtered intake charge flow rate 232 and filtered EGR mole fraction or flow rate 234 representing modified values of the desired intake charge flow rate 202 and desired EGR mole fraction 212, respectively.

Conceptually, the pre-filter module 230 is configured to modify desired reference targets or inputs (e.g., filtered intake charge flow rate 232 and filtered EGR mole fraction 234) in view of a known system response such that the system will produce reference targets or outputs equal to the desired reference targets. The pre-filter module 230 facilitates improved accuracy, efficiency and promptness in achieving a desired output effect compared to open loop control systems without a pre-filter. As shown in the function relationship 300 between a reference 302 and time 304 of FIG. 4, a typical open loop response 310 to a desired step reference target 320 undershoots the desired step reference 320 such that the desired step reference is not achieved. The modified reference response 330, which represents a response to a reference target modified by a pre-filter module, such as module 230, achieves the desired step reference 320. Generally, the pre-filter module increases the reference target such that the modified response 330 initially overshoots the desired step reference, but meets the desired reference target due to the anticipated undershoot of the response.

Based on the filtered intake charge flow rate 232, filtered EGR mole fraction 234, and desired air-to-fuel ratio 222, a command module 250 of the controller 130 generates an intake charge flow rate command 238, EGR mole fraction command 240, and air-to-fuel ratio command 242, respectively. The commands 238, 240, 242 are then communicated to plant control devices of the engine system 10, such as the vanes or rack of a VGT turbocharger (and/or associated intake throttle valve if applicable), EGR system valve, and fuel injectors, respectively. The plant control devices actuate according to the commands 238, 240 to achieve the filtered parameters 232, 234.

Figure 5:
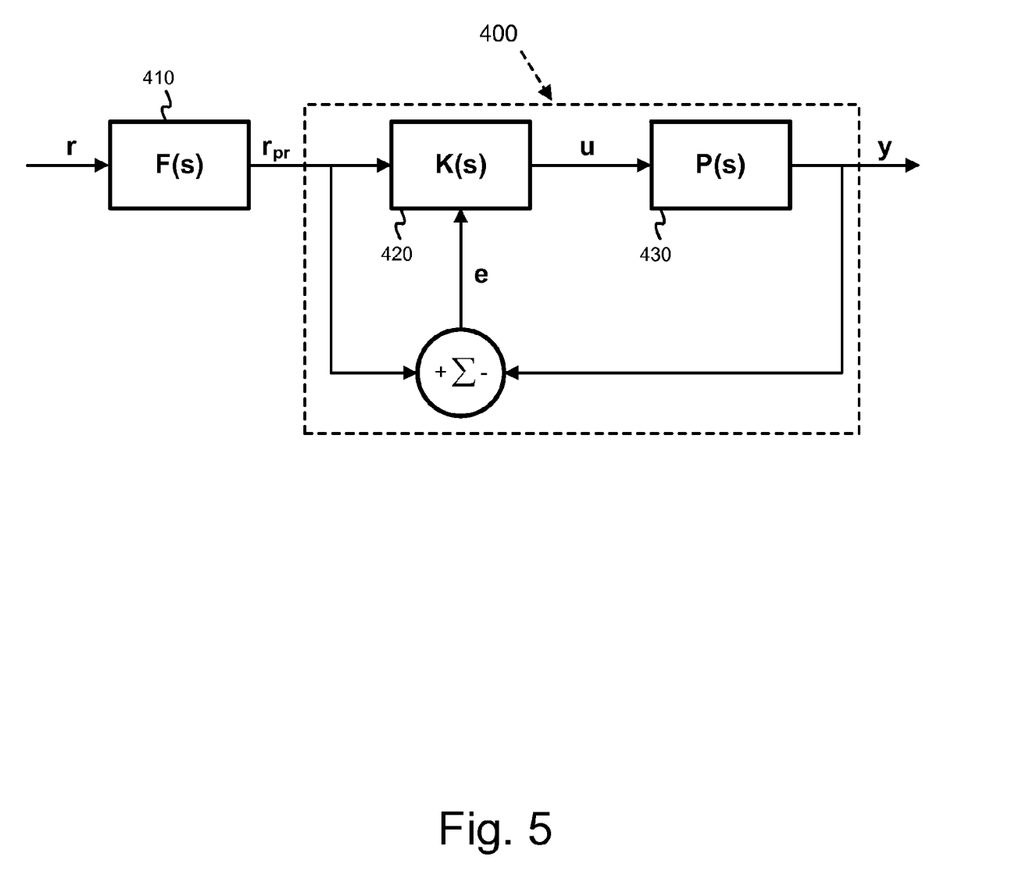
FIG. 5 is a schematic block diagram of a SISO control system having a pre-filter module according to one embodiment.

Referring to FIG. 5, the above filtering strategy can be shown generically with reference to a block diagram for a conventional single-input, single-output (SISO) control system 400. The desired reference target r (e.g., the desired EGR flow and desired charge flow) is modified by the pre-filter module 410 to produce a modified reference target $r_{pf}$. The modified reference target $r_{pf}$ is received by the control system 400 and a command generation module 420 generates a command u representing the modified reference target $r_{pf}$. The command u is communicated to a plant control device 430 and the device is actuated in response to the command u to produce an output y. If the output y is different than the desired reference target r, an error or deviation e equal to $r_{pf}-y$ is generated and fed back to the command generation module 420 to be added to the next modified reference target $r_{pf}$ to account for any errors in the system. Although the feedback loop accounts for discrepancies between the desired reference target r and the actual output y, the iterative cycles associated with the feedback loop delays the system response and may produce inaccuracies in the system 400. The pre-filter module 410 is configured to generate a modified reference target $r_{pf}$ that results in an output y substantially equaling the desired reference target r. Accordingly, the use of the pre-filter module 410 reduces the error e (e.g., output y is closer to input r), such that delays in the system response and inaccuracies in the system 400 are reduced.

The system 400 can be modeled using various transfer functions as follows:

$$S(s) = \frac{e(s)}{r_{pf}(s)} = [I + P(s)K(s)]^{-1} \quad (12)$$

$$R(s) = \frac{u(s)}{r_{pf}(s)} = K(s)[I + P(s)K(s)]^{-1} \quad (13)$$

$$C(s) = \frac{y(s)}{r_{pf}(s)} = P(s)K(s)[I + P(s)K(s)]^{-1} \quad (14)$$

where S(s) is a sensitivity transfer function, R(s) is the transfer function from the reference input r and the plant input u (excluding the pre-filter module 410), C(s) is the complimentary sensitivity transfer function, K(s) is the transfer function of a controller or the command generation module 420, P(s) is the transfer function of the plant device 430, and I is the identity matrix as is commonly known and used in the art. Based on Equations 12, 13, and 14, the pre-filter module 410 can then be modeled using the transfer function or modifier F(s), which is equal to the inverse of the complimentary sensitivity transfer function C(s), i.e., $C^{-1}(s)$. The modified reference target $r_{pf}$ is obtained by multiplying the desired reference target r by the transfer function F(s).

Figure 6:
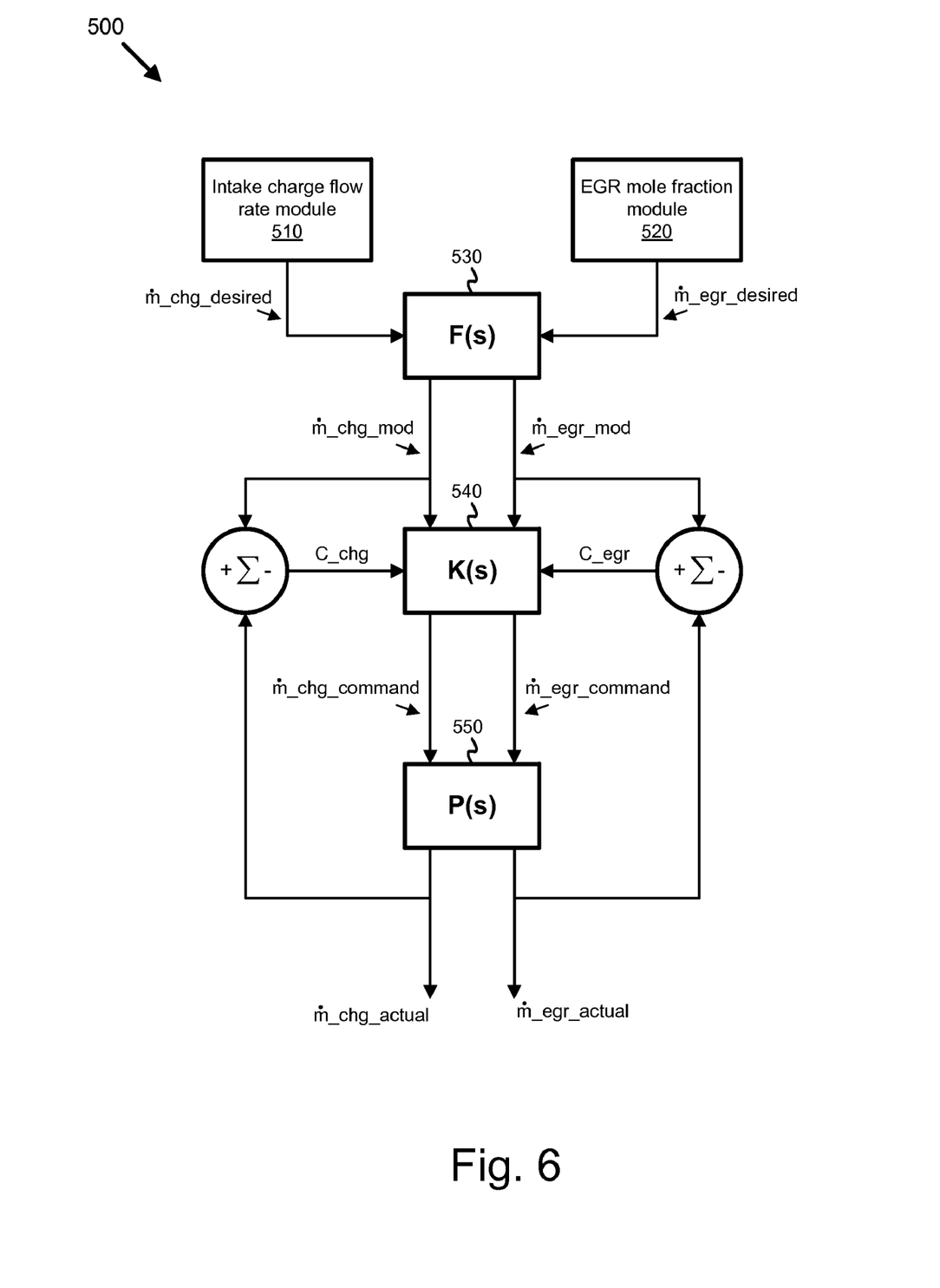
FIG. 6 is a schematic block diagram of a MIMO control system having a pre-filter module according to one embodiment.

In one specific embodiment shown in FIG. 6, a multi-input, multi-output (MIMO) air handling system 500 configured to control intake charge flow rate and EGR flow rate into the cylinder includes an intake charge flow rate module 510 and EGR mole fraction module 520. The intake charge flow rate module 510 calculates a desired intake charge mass flow rate target $\dot{m}_{chg\_desired}$ and the EGR mole fraction module 520 calculates a desired EGR mass flow rate target $\dot{m}_{egr\_desired}$. The desired intake charge mass flow rate target $\dot{m}_{chg\_desired}$ and the desired EGR mass flow rate target $\dot{m}_{egr\_desired}$ are cooperatively determined to provide a desired concentration of oxygen into the cylinder, e.g., a desired in-cylinder oxygen mole fraction and desired in-cylinder oxygen-to-fuel or air-to-fuel ratio. The system 500 includes a pre-filter module 530 configured to generate a modified intake charge mass flow rate target $\dot{m}_{chg\_mod}$ and a modified EGR mass flow rate target $\dot{m}_{egr\_mod}$ based on a complimentary sensitivity transfer matrix or modifier $C_{matrix}(s)$ as will be explained in more detail below.

Based on the modified intake charge mass flow rate target $\dot{m}_{chg\_mod}$ and the modified EGR mass flow rate target $\dot{m}_{egr\_mod}$, a command module 540 generates an intake charge mass flow rate command $\dot{m}_{chg\_command}$ and an EGR mass flow rate command $\dot{m}_{egr\_command}$. The intake charge and EGR mass flow rate commands $\dot{m}_{chg\_command}$, $\dot{m}_{egr\_command}$ are communicated to a plant module 550. The plant module 550 directly controls the actuation of the actuators and the data gathering and transmitting function of the sensors of an air intake system and EGR system of an engine system. The air intake system and EGR system can be any of various systems commonly known in the art. As commanded by the intake charge mass flow rate command $\dot{m}_{chg\_command}$ and the EGR mass flow rate command $\dot{m}_{egr\_command}$, the plant module 550 actuates the actuators of the air intake and EGR systems of the engine system, which results in an actual intake charge mass flow rate $\dot{m}_{chg\_actual}$ and an actual EGR mass flow rate $\dot{m}_{egr\_actual}$ entering the cylinder. Any discrepancies between the actual intake charge and EGR mass flow rates $\dot{m}_{egr\_actual}$, $\dot{m}_{egr\_actual}$ and the desired intake charge and EGR mass flow rate targets $\dot{m}_{chg\_desired}$, $\dot{m}_{egr\_desired}$, respectively, are accounted for in an error-based feedback loop as shown in FIG. 6. More specifically, an intake charge error $e_{chg}$ equal to the difference between $\dot{m}_{chg\_actual}$ and $\dot{m}_{chg\_desired}$ is reported back to the controller or command module 540 and the command module adjusts the $\dot{m}_{chg\_command}$ accordingly. Similarly, an EGR error $e_{egr}$ equal to the difference between $\dot{m}_{egr}$ actual and $\dot{m}_{egr\_desired}$ is reported back to the controller or command module 540 and the command module adjusts the $\dot{m}_{egr\_command}$ accordingly.

The complimentary sensitivity transfer matrix $C_{matrix}(s)$ can be expressed as follows:

$$C_{matrix}(s) = \begin{bmatrix} C_{11}(s) & C_{12}(s) \\ C_{21}(s) & C_{22}(s) \end{bmatrix} \quad (15)$$

where each of $C_{11}(s)$, $C_{12}(s)$, $C_{21}(s)$ and $C_{22}(s)$ is a complimentary sensitivity transfer function representing the matrix components of the closed loop transfer function between the system input reference and the system output. In one embodiment, the complimentary sensitivity transfer matrix $C_{matrix}(s)$ is determined by first identifying a transfer matrix $K_{matrix}(s)$ of the command module 540 and a transfer matrix $P_{matrix}(s)$ of the plant module 550 and applying Equation 14 above. The transfer matrices $K_{matrix}(s)$, $P_{matrix}(s)$ can be determined by open loop system identification of the individual components.

Alternatively, in another embodiment, the complimentary transfer matrix $C_{matrix}(s)$ is determined using a black box approach where the transfer functions $C_{11}(s)$, $C_{12}(s)$, $C_{21}(s)$ and $C_{22}(s)$ are experimentally predetermined by applying a range of input signals, such as random Gaussian signals, random binary signals, pseudo-random binary signals, and the sum of sinusoid signals to the closed loop air handling system and use standard industry tools, such as a Matlab™ system identification toolbox used, processing the input signals and corresponding output signals. The input signals can be altered until a desired output signal representing a desired transient response is achieved. In other words, each of the transfer functions $C_{11}(s)$, $C_{12}(s)$, $C_{21}(s)$ and $C_{22}(s)$ are obtained using closed loop system identification techniques. Generally, the desired transient response includes a fast transient response having a reduced overshoot and a reduced settling time.

Like the transfer function F(s) of the SISO system pre-filter module 410, the transfer matrix $F_{matrix}(s)$ of the MIMO system pre-filter module 530 is equal to the inverse of the complimentary sensitivity transfer matrix $C_{matrix}(s)$, i.e., $C_{matrix}^{-1}(s)$. Accordingly, the modified intake charge and EGR mass flow rates $\dot{m}_{chg\_mod}$, $\dot{m}_{egr\_mod}$, respectively, necessary for achieving the desired intake charge and EGR mass flow rate targets $\dot{m}_{chg\_desired}$, $\dot{m}_{egr\_desired}$, respectively, according to the desired transient response are determined as follows:

$$\begin{Bmatrix} \dot{m}_{chg\_mod} \\ \dot{m}_{egr\_mod} \end{Bmatrix} = \qquad (16)$$

$$F_{matrix}(s) \begin{Bmatrix} \dot{m}_{chg\_desired} \\ \dot{m}_{egr\_desired} \end{Bmatrix} = \begin{bmatrix} C_{11}(s) & C_{12}(s) \\ C_{21}(s) & C_{22}(s) \end{bmatrix}^{-1} \begin{Bmatrix} \dot{m}_{chg\_desired} \\ \dot{m}_{egr\_desired} \end{Bmatrix}$$

where $\dot{m}_{chg\_desired}$ is equal to $\dot{m}_{chg\_actual}$, and $\dot{m}_{egr\_desired}$ is equal to $\dot{m}_{egr\_actual}$.

Figure 7:
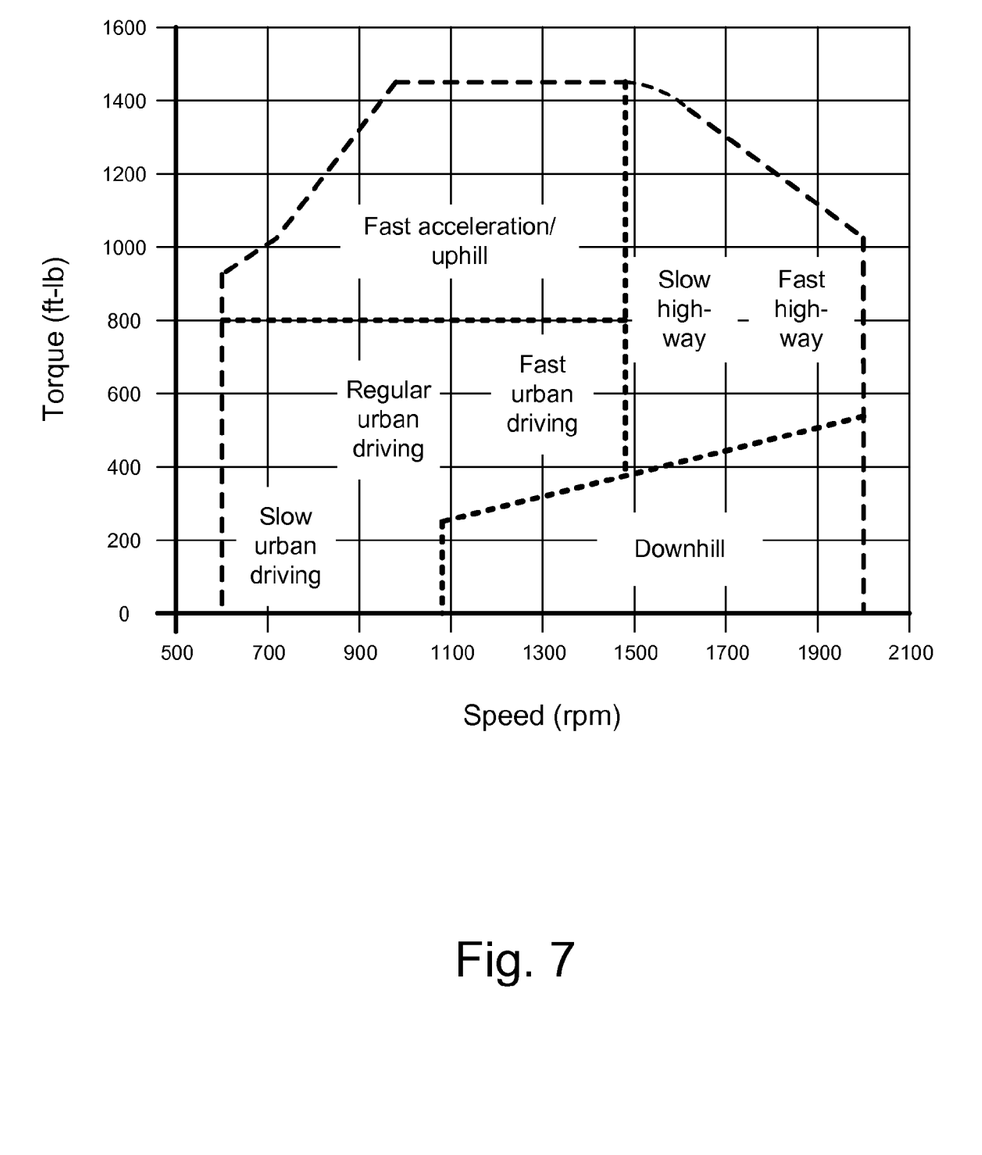
FIG. 7 is an engine map of a representative engine showing partitioned engine operating modes according to one embodiment.

The complimentary sensitivity transfer matrix $C_{matrix}(s)$ must be determined for each engine operating mode of a given engine. Each engine operating mode makes up a partitioned portion of an engine map 600, such as shown in FIG. 7. The complimentary sensitivity transfer matrices $C_{matrix}(s)$ for the different engine operating modes shown in the engine map 600 of FIG. 7 are combined to form a pre-filter scheduling strategy. For example, when an engine is operating in a specific operating mode, such as a slow highway operating mode (see FIG. 7), the pre-filter module 530 utilizes the predetermined complimentary sensitivity transfer matrix $C_{matrix}(s)$ associated with the specific operating mode to determine the modified intake charge and EGR mass flow rates $\dot{m}_{chg\_mod}$, $\dot{m}_{egr\_mod}$.

In certain instances, the pre-filter strategy accounts for the transition regions between engine operating modes by using a persistence counting strategy. The persistence counting strategy is a filtering technique designed to avoid toggling back and forth between the various regions of the map 600, particularly when the engine is operating at or near the boundaries between the modes. Generally, the persistence counting strategy attempts to ensure that the engine is operating in a given mode before taking action, e.g., commanding EGR and air charge flow rates. For example, the persistence counting strategy includes an algorithm that check the speed and torque of the engine to determine which mode the engine is operating under. But, the algorithm will also check to ensure that the engine has been consistently in a given mode (e.g., at least two seconds) before commanding an EGR or air charge flow rate especially when the engine has recently changed from one operating mode to another.

In certain embodiments, a pre-filter schedule can be stored on a memory of the engine system controller, such as controller 130. Based on the speed and torque of the engine, which can be interpreted by the controller from engine speed and engine torque signals 260, 270 generated by actual or virtual sensors, the pre-filter module 530 determines the operating mode of the engine, such as by referencing an engine map, e.g., engine map 600, and obtains the complimentary sensitivity transfer matrix corresponding to the operating mode by accessing the stored pre-filter schedule.

The schematic flow chart diagrams and method schematic diagrams described herein are generally set forth as logical flow chart diagrams. As such, the depicted order and labeled steps are indicative of representative embodiments. Other steps and methods may be conceived that are equivalent in function, logic, or effect to one or more steps, or portions thereof, of the methods illustrated in the schematic diagrams. Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown.

Figure 8:
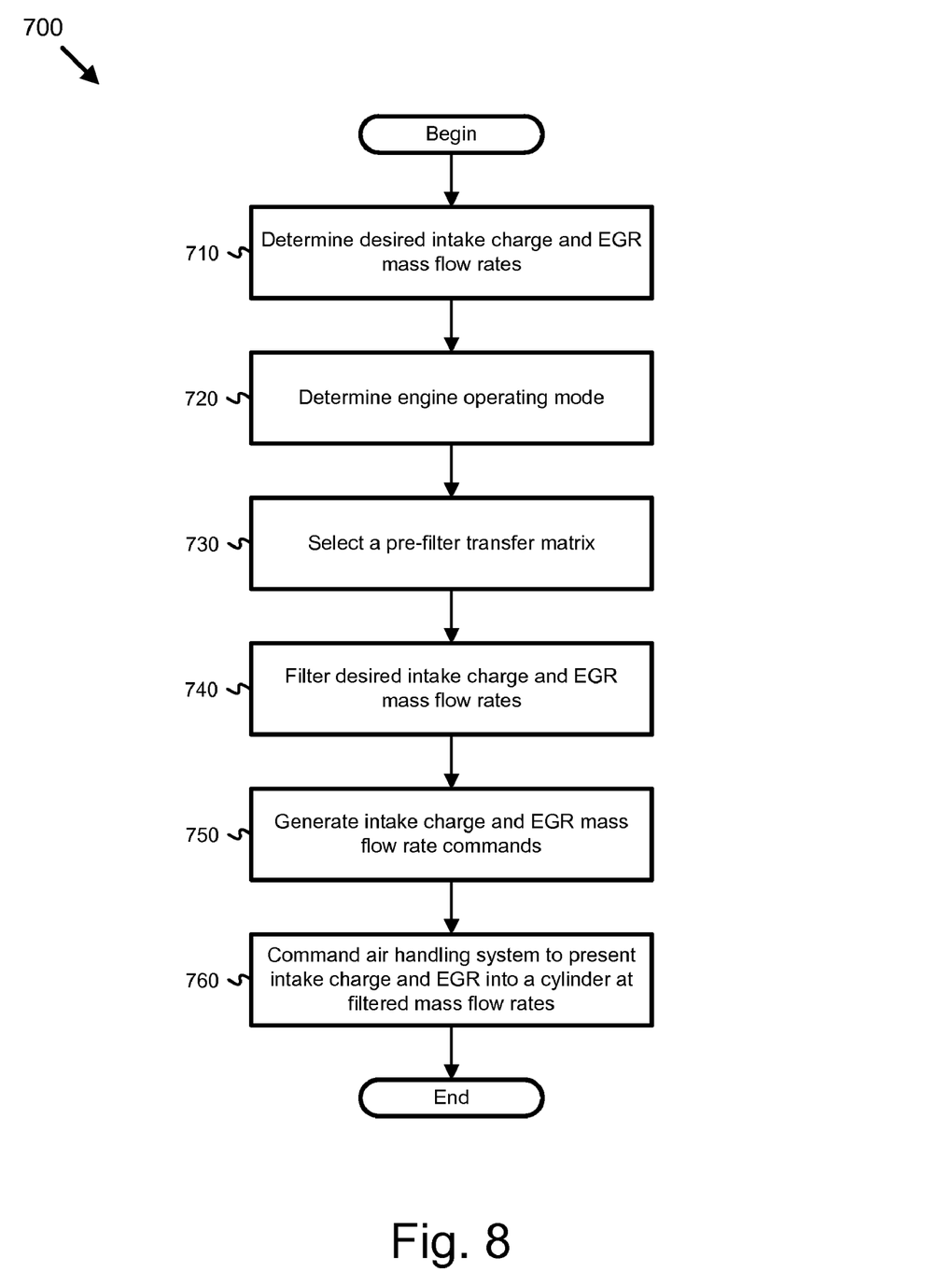
FIG. 8 is a schematic flow chart diagram representing one embodiment of a method for controlling exhaust emissions using a pre-filter.

According to one exemplary method 700 for controlling exhaust emissions using a pre-filter is shown in FIG. 8. The method 700 begins by determining 710 desired intake charge and EGR mass flow rates 202, 212. The desired intake charge and EGR mass flow rates 202, 212 correspond to a desired amount of in-cylinder oxygen for achieving a desired amount of $NO_x$ and particulate matter emissions in the exhaust and can be determined using any of various methods. For example, based on the engine operating mode, the amount of in-cylinder oxygen attributed to the intake charge relative to the amount of in-cylinder oxygen attributed to the EGR mass flow rate can vary. The method for determining the relative desired intake charge and EGR mass flow rate for achieving desired engine system performance parameters, such as emissions, can be any of various methods known in the art. In certain implementations, the desired EGR mass and air intake flow rates for a given engine configuration are obtained from a look-up table containing predetermined in-cylinder oxygen concentration values for various combinations of EGR mass flow rate and air-to-fuel ratios for the given engine configuration.

The method continues by determining 720 the operating mode of the engine 11. In certain implementations, the engine operating mode can be determined by referencing a stored look-up table representing engine map partitioning information, such as shown in FIG. 7, based on interpreted values for the engine speed and torque. Based on the determined engine operating mode, the pre-filter module 230 selects 730 a pre-filter transfer matrix corresponding to the determined engine operating mode from a plurality of pre-filter matrices. Typically, the engine operating map can be partitioned into a plurality of engine operating modes, such as shown in FIG. 7, with each operating mode represented by one of the plurality of pre-filter transfer matrices. The method also includes filtering 740 the desired intake charge and EGR mass flow rates 202, 212 using the selected pre-filter transfer matrix, or more specifically, the inverse of the selected pre-filter transfer matrix. Generally, filtering 740 includes multiplying the desired intake and EGR mass flow rates 202, 212 by the inverse of the selected pre-filter transfer matrix, such as expressed in Equation 16.

The command module, such as command modules 250, 540, then generate 750 intake charge and EGR mass flow rate commands, such as commands 238, 240, representing the filtered or modified intake charge and EGR mass flow rates. The intake charge and EGR mass flow rate commands are communicated to air handling components of an air handling system to command the components to actuate to introduce intake charge and EGR into the cylinders at the filtered intake charge and EGR flow rates. Because the filtered intake charge and EGR flow rates have been modified to compensate for the slow and undershooting system responses typically associated with transient operating conditions, the actual intake charge and EGR mass flow rates $\dot{m}_{chg\_actual}$, $\dot{m}_{egr\_actual}$ produced in response to the intake charge and EGR mass flow rate commands 238, 240 of the present system 500 more accurately track the desired intake charge and EGR mass flow rates $\dot{m}_{chg\_desired}$, $\dot{m}_{egr\_desired}$.

Although the above pre-filter strategy for improving transient system response has been applied to system responses associated with commanded intake charge and EGR mass flow rates, the pre-filter strategy can be applied to any commanded parameter in a control system to improve the transient system response of that parameter. For example, a pre-filter transfer function F(s) for a single parameters in SISO systems and a pre-filter transfer matrix $F_{matrix}(s)$ for multiple parameters in MIMO systems can be predetermined based on a desired transient system response of the respective parameters. Any desired input parameter value can be multiplied by a predetermined transfer function F(s) to obtain a modified input parameter value and any multiple desired input parameters can be multiplied by a predetermined transfer matrix $F_{matrix}(s)$ to obtain modified input parameters as has been described above. Moreover, although the pre-filter strategy described above in association with FIG. 6 has been applied to two input parameters, the same pre-filter strategy principles described above can be applied to more than two input parameters to achieve desired transient system responses for each input parameter.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for improving the tracking bandwidth of an air handling system of an internal combustion engine, the air handling system comprising a fresh air regulator configured to regulate the flow rate of fresh air into a combustion chamber of the engine and an exhaust gas recirculation (EGR) regulator for regulating the flow rate of EGR gas into the combustion chamber, comprising:

an intake charge module configured to determine a desired air intake flow rate into the combustion chamber based at least partially on a desired oxygen concentration in the combustion chamber;

an EGR system module configured to determine a desired EGR gas flow rate into the combustion chamber based at least partially on the desired oxygen concentration in the combustion chamber; and a pre-filter module configured to modify the desired air intake flow rate and the desired EGR gas flow rate based at least partially on predetermined transient response characteristics of the air handling system;

wherein the desired air intake flow rate is achievable by commanding the fresh air regulator to achieve the modified air intake flow rate and the desired EGR gas flow rate is achievable by commanding the EGR regulator to achieve the modified EGR gas flow rate.

2. The apparatus of claim 1, wherein the pre-filter module is configured to increase the desired air intake flow rate and the desired EGR gas flow rate such that the modified air intake flow rate is higher than the desired air intake flow rate and the modified EGR gas flow rate is higher than the desired EGR gas flow rate.

3. The apparatus of claim 1, wherein an actual air intake flow rate response resulting from the commanded air intake flow rate initially overshoots the desired air intake flow rate.

4. The apparatus of claim 1, wherein an actual air intake flow rate response increases up to an air intake flow rate above the desired air intake flow rate during a first time period and decreases down to the desired air intake flow rate during a second time period following the first time period.

5. The apparatus of claim 1, wherein an actual EGR flow rate response resulting from the commanded EGR gas flow rate initially overshoots the desired EGR gas flow rate.

6. The apparatus of claim 1, wherein an actual EGR flow rate response increases up to an EGR gas flow rate above the desired EGR gas flow rate during a first time period and decreases down to the desired EGR gas flow rate during a second time period following the first time period.

7. The apparatus of claim 1, wherein the modified air intake flow rate is determined by multiplying the desired air intake flow rate by $C^{-1}(s)$, and wherein $C(s)$ is equal to $P(s)K(s)[I+P(s)K(s)]^{-1}$ where $P(s)$ comprises a transfer function of the fresh air regulator, $K(s)$ comprises a transfer function of a fresh air flow command generation module, and I comprises an identity matrix.

8. The apparatus of claim 1, wherein the modified EGR gas flow rate is determined by multiplying the desired EGR gas flow rate by $C^{-1}(s)$, and wherein $C(s)$ is equal to $P(s)K(s)[I+P(s)K(s)]^{-1}$ where $P(s)$ comprises a transfer function of the EGR regulator, $K(s)$ comprises a transfer function of an EGR command generation module, and I comprises an identity matrix.

9. The apparatus of claim 1, wherein the modified air intake flow rate and modified EGR gas flow rate are determined by multiplying a column matrix $$\left\{\begin{array}{c} \dot{m}_{chg\_desired} \\ \dot{m}_{egr\_desired} \end{array}\right\}$$

by the inverse of a complimentary sensitivity transfer matrix $$\begin{bmatrix} C_{11}(s) & C_{12}(s) \\ C_{21}(s) & C_{22}(s) \end{bmatrix}$$

where $\dot{m}_{chg\_desired}$ is the desired air intake flow rate, $\dot{m}_{egr\_desired}$ is the desired EGR gas flow rate, and each of $C_{11}(s), C_{12}(s), C_{21}(s)$ and $C_{22}(s)$ is a complimentary sensitivity transfer function.

10. The apparatus of claim 1, wherein the fresh air regulator comprises a variable geometry turbocharger and the EGR regulator comprises an EGR valve.

11. The apparatus of claim 10, wherein the fresh air regulator comprises an air intake assist throttle.

12. A method for controlling the flow rate of air intake and exhaust gas recirculation (EGR) gas into a combustion chamber of an internal combustion engine, the flow rate of the air intake being regulated by a variable geometry turbocharger (VGT) and the flow rate of the EGR gas being regulated by an EGR valve, the method comprising:

determining a desired air intake flow rate and a desired EGR gas flow rate corresponding to a desired oxygen concentration in the combustion chamber;

multiplying the desired air intake flow rate and desired EGR gas flow rate by a pre-filter modifier to obtain a modified air intake flow rate and modified EGR gas flow rate;

commanding the VGT according to the modified air intake flow rate to achieve the desired air intake flow rate; and commanding the EGR valve according to the modified EGR gas flow rate to achieve the desired EGR gas flow rate.

13. The method of claim 12, wherein the pre-filter modifier is at least partially dependent on the transient response characteristics of the VGT and EGR valve.

14. The method of claim 12, wherein the pre-filter modifier is at least partially dependent on an operating mode of the internal combustion engine.

15. The method of claim 12, further comprising:

determining an actual air intake flow rate and an actual EGR gas flow rate;

calculating a first difference between the actual air intake flow rate and the desired air intake flow rate and calculating a second difference between the actual EGR gas flow rate and the desired EGR gas flow rate; and modifying the modified air intake flow rate according to the first difference and modifying the modified EGR gas flow rate according to the second difference.

16. The method of claim 12, wherein:

the air intake flow rate generated by the VGT in response to commanding the VGT initially overshoots the desired air intake flow rate; and the EGR gas flow rate generated by the EGR valve in response to commanding the EGR valve initially overshoots the desired EGR gas flow rate.

17. The method of claim 12, wherein the pre-filter modifier is selected from a plurality of pre-filter modifiers each corresponding to a respective operating condition of the internal combustion engine.

18. An internal combustion engine system, comprising:

an internal combustion engine generating an engine output exhaust;

an air handling system for injecting combustion gas into the engine comprising a variable geometry turbocharger (VGT), an air intake assist throttle, and an EGR valve; and a controller comprising:

an air handling system parameters module configured to determine a desired air intake flow rate and a desired EGR gas flow rate into the engine, the desired air intake and EGR gas flow rates corresponding to a desired emissions level in the engine output exhaust;

a pre-filter module configured to determine a modified air intake flow rate and a modified EGR gas flow rate based at least partially on command response characteristics of the air handling system; and a command module configured to command the VGT and air intake assist throttle according to the modified air intake flow rate and command the EGR valve according to the modified EGR gas flow rate;

wherein an actual air intake flow rate produced by the VGT and air intake assist throttle in response to the air intake throttle command achieves the desired air intake flow rate and the actual EGR gas flow rate produced by the EGR valve in response to the EGR valve command achieves the desired EGR gas flow rate.

19. The system of claim 18, further comprising a fuel injection system, wherein the controller comprises an air-to-fuel ratio module configured to determine a desired air-to-fuel ratio, and wherein the command module is configured to command the fuel injection system to inject an amount of fuel into the engine for achieving the desired air-to-fuel ratio, the commanded fuel amount being dependent on the desired air intake flow rate and desired EGR gas flow rate.

20. The system of claim 18, wherein:
an actual air intake flow rate response increases up to an air intake flow rate above the desired air intake flow rate during a first time period and decreases down to the desired air intake flow rate during a second time period following the first time period; and
an actual EGR flow rate response increases up to an EGR gas flow rate above the desired EGR gas flow rate during a third time period and decreases down to the desired EGR gas flow rate during a fourth time period following the third time period.

21. The system of claim 18, wherein modified air intake flow rate is higher than the desired air intake flow rate and modified EGR gas flow rate is higher than the desired EGR gas flow rate.

22. The system of claim 18, wherein:
the pre-filter module comprises a predetermined air intake and EGR gas scheduling strategy map indicating a plurality of predetermined flow rate modifiers for each of a plurality of engine operating modes;
the pre-filter module determines the modified air intake flow rate by multiplying the flow rate modifier associated with the operating mode within which the engine is operating by the desired air intake flow rate; and
the pre-filter module determines the modified EGR gas flow rate by multiplying the flow rate modifier associated with the operating mode within which the engine is operating by the desired EGR gas flow rate.

23. The system of claim 18, wherein:
the controller further comprises a feedback module configured to determine any discrepancies between the actual air intake flow rate and desired air intake flow rate and the actual EGR gas flow rate and desired EGR gas flow rate;
the command module is configured to modify the modified air intake flow rate according to determined discrepancies between the actual air intake flow rate and desired air intake flow rate; and
the command module is configured to modify the modified EGR gas flow rate according to determined discrepancies between the actual EGR gas flow rate and desired EGR gas flow rate.

* * * * *